(12) United States Patent
Junk

(10) Patent No.: US 8,533,964 B1
(45) Date of Patent: Sep. 17, 2013

(54) VERTICAL ORIENTATION INDICATOR FOR USE AFTER AN AVALANCHE

(76) Inventor: Thomas Junk, Ogden, UT (US)

( * ) Notice: Subject to any disclaimer, the term of this patent is extended or adjusted under 35 U.S.C. 154(b) by 196 days.

(21) Appl. No.: 13/159,476

(22) Filed: Jun. 14, 2011

(51) Int. Cl.
*G01C 9/14* (2006.01)
*G01C 9/16* (2006.01)

(52) U.S. Cl.
USPC .............................................. 33/378; 33/398

(58) Field of Classification Search
USPC .............................. 33/377, 378, 391, 396, 398
See application file for complete search history.

(56) References Cited

U.S. PATENT DOCUMENTS

| | | | | |
|---|---|---|---|---|
| 1,376,727 A | * | 5/1921 | Lyon Pentz et al. | ............ 33/352 |
| 1,399,423 A | * | 12/1921 | Cunningham | ................... 33/396 |
| 1,855,664 A | * | 4/1932 | Budge | ............................. 33/396 |
| 2,595,109 A | * | 4/1952 | Steady | ............................ 33/378 |
| 2,859,725 A | * | 11/1958 | Genasci | .......................... 33/391 |
| 3,084,443 A | | 4/1963 | Kaatz et al. | |
| 4,843,725 A | * | 7/1989 | Harris | ............................ 33/391 |
| 4,902,129 A | * | 2/1990 | Siegmund et al. | ......... 356/241.4 |
| 4,932,133 A | | 6/1990 | Bruhn | |
| 5,450,676 A | * | 9/1995 | Thornsberry | .............. 33/366.16 |
| 5,467,532 A | * | 11/1995 | Ames | .............................. 33/334 |
| 5,476,258 A | * | 12/1995 | Frisone | ......................... 473/404 |
| 5,586,393 A | * | 12/1996 | Pherigo et al. | ................... 33/288 |
| 5,794,355 A | * | 8/1998 | Nickum | ..................... 33/366.16 |
| 6,115,928 A | | 9/2000 | Dauerer | |
| 6,270,386 B1 | | 8/2001 | Visocekas | |
| 7,603,961 B2 | | 10/2009 | Mayenschein et al. | |
| D629,199 S | | 12/2010 | Minneman | |

* cited by examiner

*Primary Examiner* — Christopher Fulton
(74) *Attorney, Agent, or Firm* — Kyle Fletcher

(57) ABSTRACT

The vertical orientation indicator includes a liquid filled sphere into which two internal spheres are provided, which define a vertical axis that is useful to a person trapped under snow after an avalanche. The internal spheres have different densities such that one internal sphere rises to the top of the liquid or is otherwise buoyant with respect to the fluid. The second internal sphere has a density that places the internal sphere at the bottom of the liquid, and thus indicates a down direction. The outer sphere containing the liquid is clear and may include a loop to provide a means of attachment to outerwear used by the end user. The internal spheres may be coated in phosphorescent paints of differing colors, which are energized by light such that the device may be used in a dark environment, such as under snow after an avalanche.

14 Claims, 4 Drawing Sheets

VERTICAL ORIENTATION INDICATOR FOR USE AFTER AN AVALANCHE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of axial indicators, more specifically, a vertical orientation indicator that is to be used after an avalanche to determine vertical direction.

B. Discussion of the Prior Art

As will be discussed immediately below, no prior art discloses a liquid filled sphere in which two opposing internal spheres are submerged; wherein the internal spheres have different densities that enable one sphere to rise to the top of the liquid located within the sphere whereas the opposing internal sphere drops to the bottom of the liquid and thus defines a vertical axis between the two internal spheres; wherein the internal sphere at the top of the liquid indicates an up direction of the vertical axis whereas the internal sphere vertical axis; wherein the device is useful in indicating which direction is up to an end user that may be suspended underneath snow after an avalanche.

The Mayenschein et al. Patent (U.S. Pat. No. 7,603,961) discloses a lighted orientation device that includes a float constructed of resilient material and includes first and second chemicals separated by a breakable membrane; wherein the two chemicals react when combined to produce light whereby a user may view the float and ascertain which direction is "up." However, the device does not include two spheres contained within a hollow sphere filled with fluid such that the two spheres separate from one another via their relative densities thereby identifying the vertical axis.

The Bruhn Patent (U.S. Pat. No. 4,932,133) discloses a post avalanche upward indicating device. However, the device does not use two spheres of different relative densities that are both suspended within a fluid filled sphere and of which form a vertical axis to identify which way is up and which way is down.

The Dauerer Patent (U.S. Pat. No. 6,115,928) discloses a fiber optic position indicator. Again, the indicator employs the use of a single ball suspended within a fluid filled chamber and not two opposing spheres of different relative densities that are both suspended within a fluid filled sphere that determines a vertical axis.

The Kaatz et al. Patent (U.S. Pat. No. 3,084,443) discloses a directional indicator. Again, the direction indicator relies upon a single moving object and not two opposing spheres suspended within a liquid filled sphere.

While the above-described devices fulfill their respective and particular objects and requirements, they do not describe a liquid filled sphere in which two opposing internal spheres are submerged; wherein the internal spheres have different densities that enable one sphere to rise to the top of the liquid located within the sphere whereas the opposing internal sphere drops to the bottom of the liquid and thus defines a vertical axis between the two internal spheres; wherein the internal sphere at the top of the liquid indicates an up direction of the vertical axis whereas the internal sphere at the bottom of the liquid indicates a down direction of the vertical axis; wherein the device is useful in indicating which direction is up to an end user that may be suspended underneath snow after an avalanche. In this regard, the vertical orientation indicator departs from the conventional concepts and designs of the prior art.

SUMMARY OF THE INVENTION

The vertical orientation indicator includes a liquid filled sphere into which two internal spheres are provided, which define a vertical axis that is useful to a person trapped under snow after an avalanche. The internal spheres have different densities such that one internal sphere rises to the top of the liquid or is otherwise buoyant with respect to the fluid. The second internal sphere has a density that places the internal sphere at the bottom of the liquid, and thus indicates a down direction. The outer sphere containing the liquid is clear and may include a loop to provide a means of attachment to outerwear used by the end user. The internal spheres may be coated in phosphorescent paints of differing colors, which are energized by light such that the device may be used in a dark environment, such as under snow after an avalanche.

It is an object of the invention to provide a device that indicates to an end user the up direction as well as down direction when the end user is buried under snow after an avalanche.

A further object of the invention is to provide a device that employs the use of two internal spheres of differing densities that define an up direction and a down direction, and which collectively define a vertical axis.

A further object of the invention is to provide the internal spheres with phosphorescent paint or like materials that provide a glow-in-the-dark effect, which is needed in a dark environment so as to provide visibility to the vertical axis.

A further object of the invention is to provide an outer sphere that contains the liquid and internal spheres.

A further object of the invention is to provide the outer sphere of durable construction so as to withstand forces generated during an avalanche.

A further object of the invention is to provide the outer sphere of clear construction and a loop to provide a means of attachment to out wear worn by the end user.

These together with additional objects, features and advantages of the vertical orientation indicator will be readily apparent to those of ordinary skill in the art upon reading the following detailed description of presently preferred, but nonetheless illustrative, embodiments of the vertical orientation indicator when taken in conjunction with the accompanying drawings.

In this respect, before explaining the current embodiments of the vertical orientation indicator in detail, it is to be understood that the vertical orientation indicator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vertical orientation indicator.

It is therefore important that the claims be regarded as including such equivalent construction insofar as they do not depart from the spirit and scope of the vertical orientation indicator. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
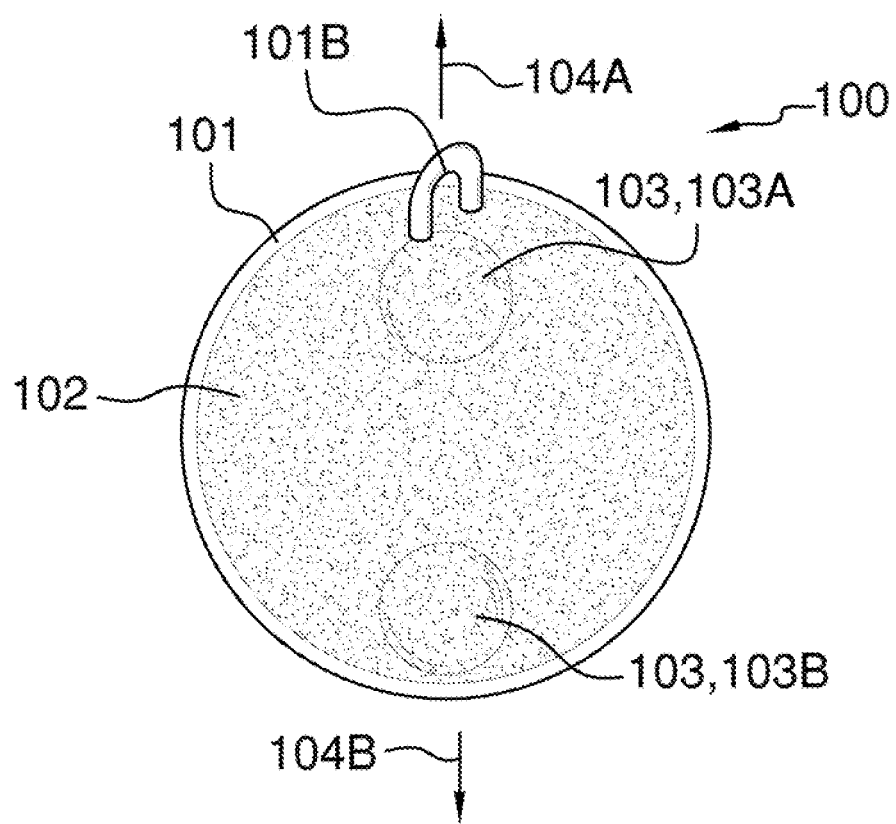
FIG. 1 illustrates a perspective view of the vertical orientation indicator by itself and illustrating the two internal spheres located within the outer sphere, and further defining the liquid filled within the outer sphere.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-4. A vertical orientation indicator 100 (hereinafter invention) includes an outer sphere 101 of clear and durable construction. The outer sphere 101 may be made of a plastic or glass that can withstand forces generated during an avalanche.

The outer sphere 101 is also hollow, and includes a fluid 102 located within, and which contains two internal spheres 103. It shall be noted that the two internal spheres 103 may be further defined as a first internal sphere 103A and a second internal sphere 103B.

The fluid 102 and the internal spheres 103 collectively account for the entire interior volume of the outer sphere 101. More specifically, the volume of the fluid 102 and the internal sphere 103 is collectively equal to the overall interior volume of the outer sphere 101.

The first internal sphere 103A has a density that is less than the density of the second internal sphere 103B. The density of the first internal sphere 103A is less than the liquid 102, which enables the first internal sphere 103A to rise to a topmost position of the liquid 102 within the outer sphere 101. The second internal sphere 103B has a density greater than both the liquid 102 and the first internal sphere 103A such that the second internal sphere 103B drops to a bottommost position of the liquid 102 irrespective of the outer sphere 101.

Figure 2:
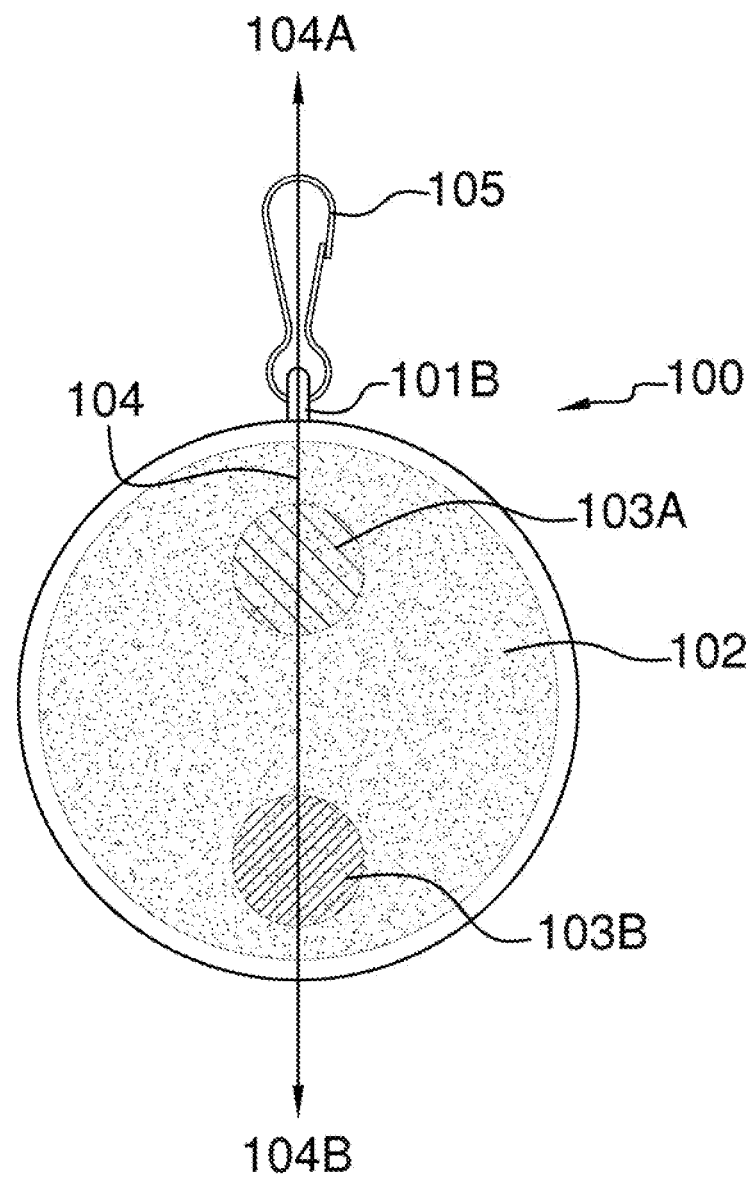
FIG. 2 illustrates a side view of the vertical orientation indicator in which the two internal spheres are positioned at different locations within the outer sphere and defining the vertical axis defined by the up direction and the down direction.
Figure 3:
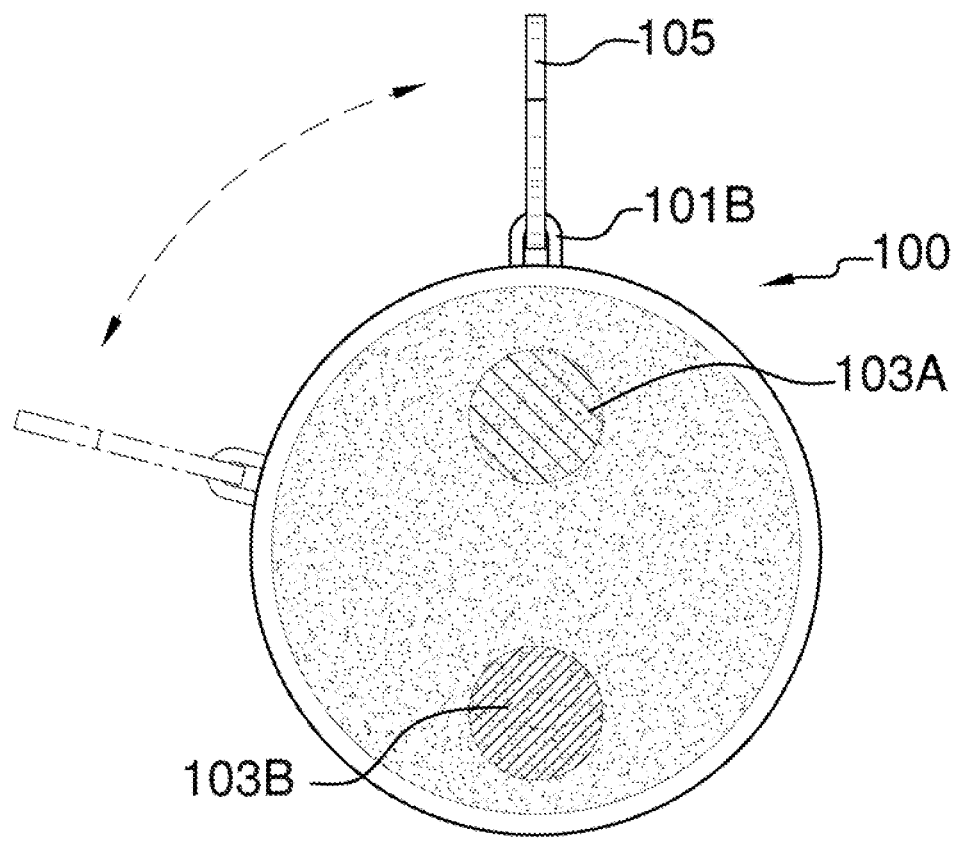
FIG. 3 illustrates a side view of the vertical orientation indicator in which a rotational arrow indicates movement of the outer sphere while the liquid and internal spheres stay in the same position so as to indicate the vertical axis without deference to the movement of the outer sphere.

Referring to FIGS. 2-3, it shall be noted that the first internal sphere 103A has a low density as denoted that the pattern defining the first internal sphere 103A; whereas the pattern of the second internal sphere 103B is more concentrated thereby denoting a greater density relationship with respect to the first internal sphere 103A.

The second internal sphere 103B drops to a bottommost position of the liquid 102, and defines a down direction 104B whereas the first internal sphere 103A defines an up direction 104A. It shall be noted that the up direction 104A and the down direction 104B form a vertical axis 104 that is used by an end user 130 to decipher which way is up and which way is down when trapped under snow 140 after an avalanche.

Referring to FIG. 3, the internal spheres 103 and the fluid 102 move about the interior of the outer sphere 101 irrespective of whether the outer sphere 101 is revolved about itself. The spatial relationship of the internal spheres 103 and the fluid 102 are not influenced from movement of the outer sphere 101.

Located on an exterior surface of the outer sphere 101 is a loop 101B, which enables the invention 100 to be secured to another object such as outerwear that may be worn by the end user 130. More particularly, a clip 105 may be used to secure the invention 100 to another object via the loop 101B.

Figure 4:
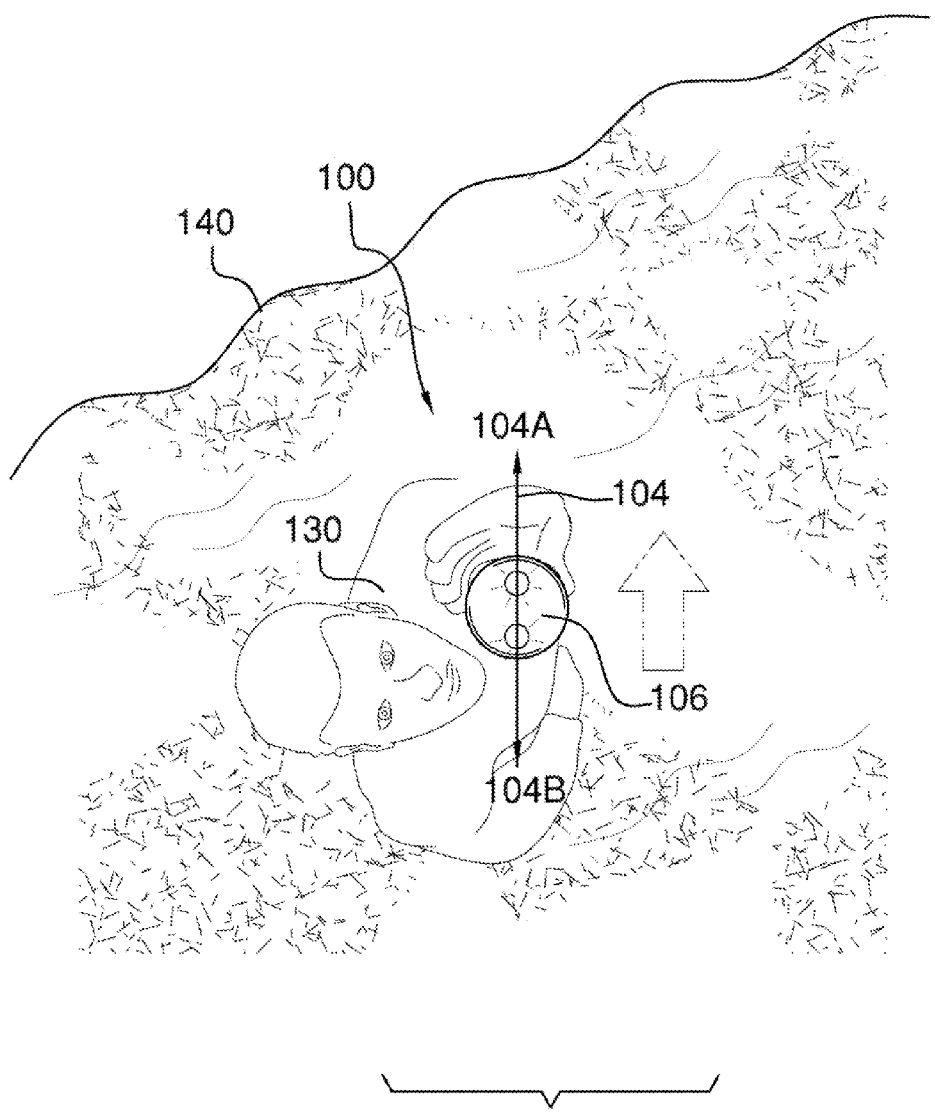
FIG. 4 illustrates a view of the vertical orientation indicator in use with an end user suspended under snow in an avalanche, and depicting the relative location of the two internal spheres in which the arrow indicates the up direction as one of the internal spheres is floating atop the liquid located within the outer sphere.

Referring to FIG. 4 it shall be noted that the internal spheres 103 are depicted as releasing light 106 as depicted by the light lines emanating from the internal spheres 103. That being said, the internal spheres 103 may be coated in a paint or material that glows in the dark, and may involve a phosphorescent material that is illuminated after exposure to light. The use of a glow in the dark material is desirable such that the invention 100 can be used for the intended purpose when the end user 130 is encased in snow 140. It shall be further noted that the glow in the dark material shall have differing colors used to differential the first internal sphere 103A from the second internal sphere 103B.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vertical orientation indicator comprising:
   an outer sphere containing a fluid and two internal spheres of differing densities such that one of the internal spheres rises to a topmost position in said fluid whereas an opposing internal sphere drops to a bottommost position within said fluid thereby forming a vertical axis identifying an up direction and a down direction for use by a victim of an avalanche;
   wherein the two internal spheres are not connected to one another, and are free to move independent of one another inside of the outer sphere;
   wherein the volume of the fluid and the internal spheres is collectively equal to the overall interior volume of the outer sphere.

2. The vertical orientation indicator as described in claim 1 wherein the internal spheres are coated in a material that glows in the dark so as to enable viewing by the end user when in a dark place.

3. The vertical orientation indicator as described in claim 1 wherein the outer sphere is made of a material that is clear and comprising a plastic or glass.

4. The vertical orientation indicator as described in claim 1 wherein the two internal spheres may be further defined as a first internal sphere and a second internal sphere.

5. The vertical orientation indicator as described in claim 4 wherein the first internal sphere has a density that is less than the density of the second internal sphere.

6. The vertical orientation indicator as described in claim 4 wherein the density of the first internal sphere is less than the liquid, which enables the first internal sphere to rise to the topmost position of the liquid within the outer sphere; wherein the second internal sphere has a density greater than both the liquid and the first internal sphere such that the second internal sphere drops to the bottommost position of the liquid irrespective of the outer sphere.

7. The vertical orientation indicator as described in claim 6 where upon the second internal sphere drops to said bottommost position of the liquid, and defines the down direction whereas the first internal sphere floats to the topmost position of the fluid and defines an up direction.

8. The vertical orientation indicator as described in claim 6 wherein the up direction and the down direction form a vertical axis that is used by the end user to decipher which way is up and which way is down when trapped under snow after an avalanche.

9. The vertical orientation indicator as described in claim 8 wherein located on an exterior surface of the outer sphere is a loop, which enables the vertical orientation indicator to be secured to another object via a clip.

10. The vertical orientation indicator as described in claim 9 wherein the first internal sphere and the second internal sphere are both coated in a material that glows in the dark so as to emit light when in the dark.

11. The vertical orientation indicator as described in claim 10 wherein the first internal sphere is coated in a color different from the second internal sphere.

12. A vertical orientation indicator comprising:
    an outer sphere containing a fluid and two internal spheres of differing densities such that one of the internal spheres rises to a topmost position in said fluid whereas an opposing internal sphere drops to a bottommost position within said fluid thereby forming a vertical axis identifying an up direction and a down direction for use by a victim of an avalanche;
    wherein the internal spheres are coated in a material that glows in the dark so as to enable viewing by the end user when in a dark place;
    wherein the volume of the fluid and the internal spheres is collectively equal to the overall interior volume of the outer sphere;
    wherein the two internal spheres may be further defined as a first internal sphere and a second internal sphere;
    wherein the first internal sphere and the second internal sphere are not connected to one another, and are free to move independent of one another inside of the outer sphere;
    wherein the first internal sphere has a density that is less than the density of the second internal sphere;
    wherein the density of the first internal sphere is less than the liquid, which enables the first internal sphere to rise to a topmost position of the liquid within the outer sphere; wherein the second internal sphere has a density greater than both the liquid and the first internal sphere such that the second internal sphere drops to the bottommost position of the liquid irrespective of the outer sphere;
    where upon the second internal sphere drops to said bottommost position of the liquid, and defines the down direction whereas the first internal sphere rises to a topmost position of the fluid and defines an up direction;
    wherein the up direction and the down direction form a vertical axis that is used by the end user to decipher which way is up and which way is down when trapped under snow after an avalanche;
    wherein located on an exterior surface of the outer sphere is a loop, which enables the vertical orientation indicator to be secured to another object via a clip.

13. The vertical orientation indicator as described in claim 12 wherein the outer sphere is made of a material that is clear and comprising a plastic or glass.

14. The vertical orientation indicator as described in claim 12 wherein the first internal sphere is coated in a color different from the second internal sphere.

* * * * *